United States Patent [19]

Lynn et al.

[11] 4,402,790

[45] Sep. 6, 1983

[54] COKE OVEN FLUE TEMPERATURE MEASURING PROCESS AND PROBE MACHINE

[75] Inventors: James B. Lynn; George E. Kisner, both of Bethlehem, Pa.

[73] Assignee: Bethlehem Steel Corporation, Bethlehem, Pa.

[21] Appl. No.: 374,822

[22] Filed: May 4, 1982

[51] Int. Cl.³ ............... C10B 21/00; C10B 45/00; G01J 5/04; G01K 1/12
[52] U.S. Cl. ............... 201/1; 202/270; 350/96.1; 350/96.24; 374/130; 374/141
[58] Field of Search ............... 201/1, 41; 202/151, 202/270; 374/130, 141; 356/44, 241; 250/227; 350/96.1, 96.24

[56] References Cited

U.S. PATENT DOCUMENTS

| | | |
|---|---|---|
| 2,020,019 | 11/1935 | Collins et al. |
| 3,051,035 | 8/1962 | Root. |
| 3,374,950 | 3/1968 | Menzel et al. ............ 250/227 |
| 3,577,784 | 5/1971 | Kovacic ............ 202/151 |
| 3,666,949 | 5/1972 | De Falco et al. ............ 350/96.24 |
| 4,000,653 | 1/1977 | Booth et al. |
| 4,065,059 | 12/1977 | Jablin ............ 356/241 |
| 4,356,395 | 10/1982 | Miller ............ 350/96.1 |

*Primary Examiner*—Bradley Garris
*Attorney, Agent, or Firm*—John I. Iverson; William B. Noll

[57] ABSTRACT

A temperature measuring probe and method of detecting infrared radiation from flue walls and transmitting the detected infrared radiation through fiber optic cables to photoelectric detection-conversion cells which convert the radiation to electrical signals which are measured and translated into temperatures. Concentric metallic flexible hose mounted on a carriage for mobility provides water cooling for the fiber optic cable with a portable reeling machine for controlling the movement of the cable, hose, and probe head. The probe head provides viewing ports for the terminal ends of the fiber optic cable.

12 Claims, 9 Drawing Figures

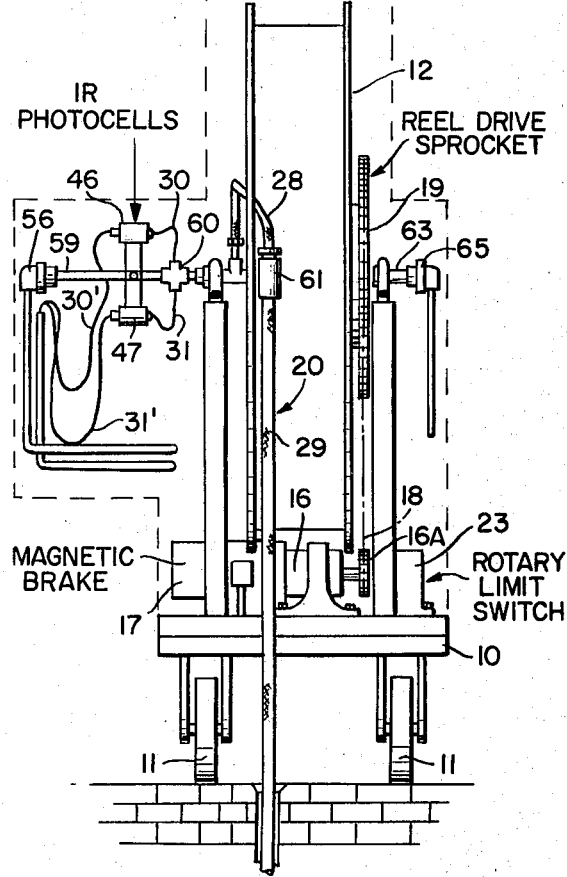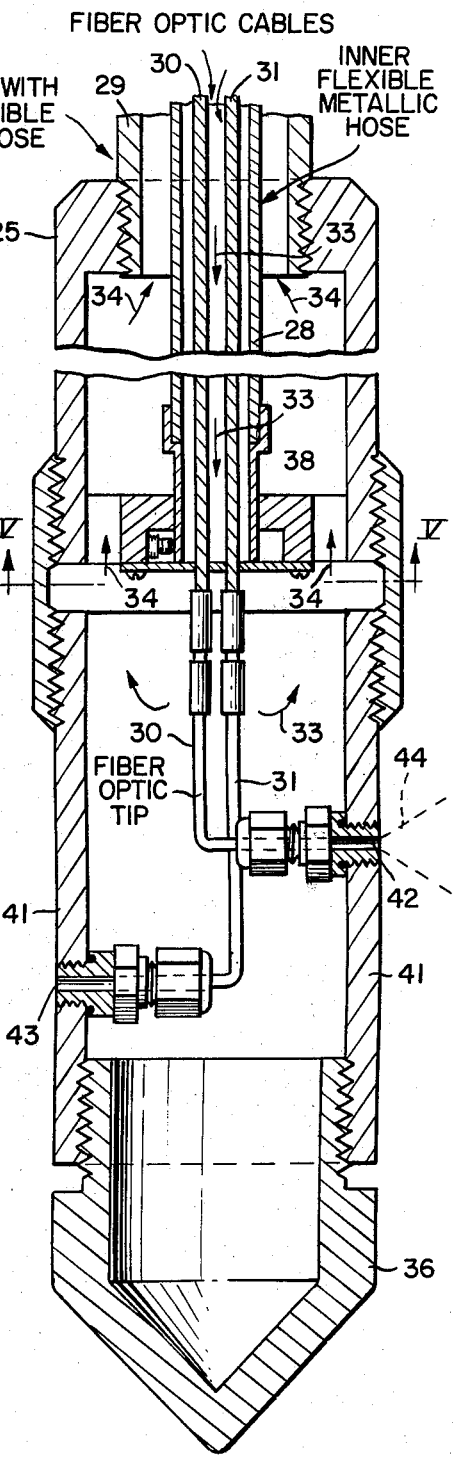

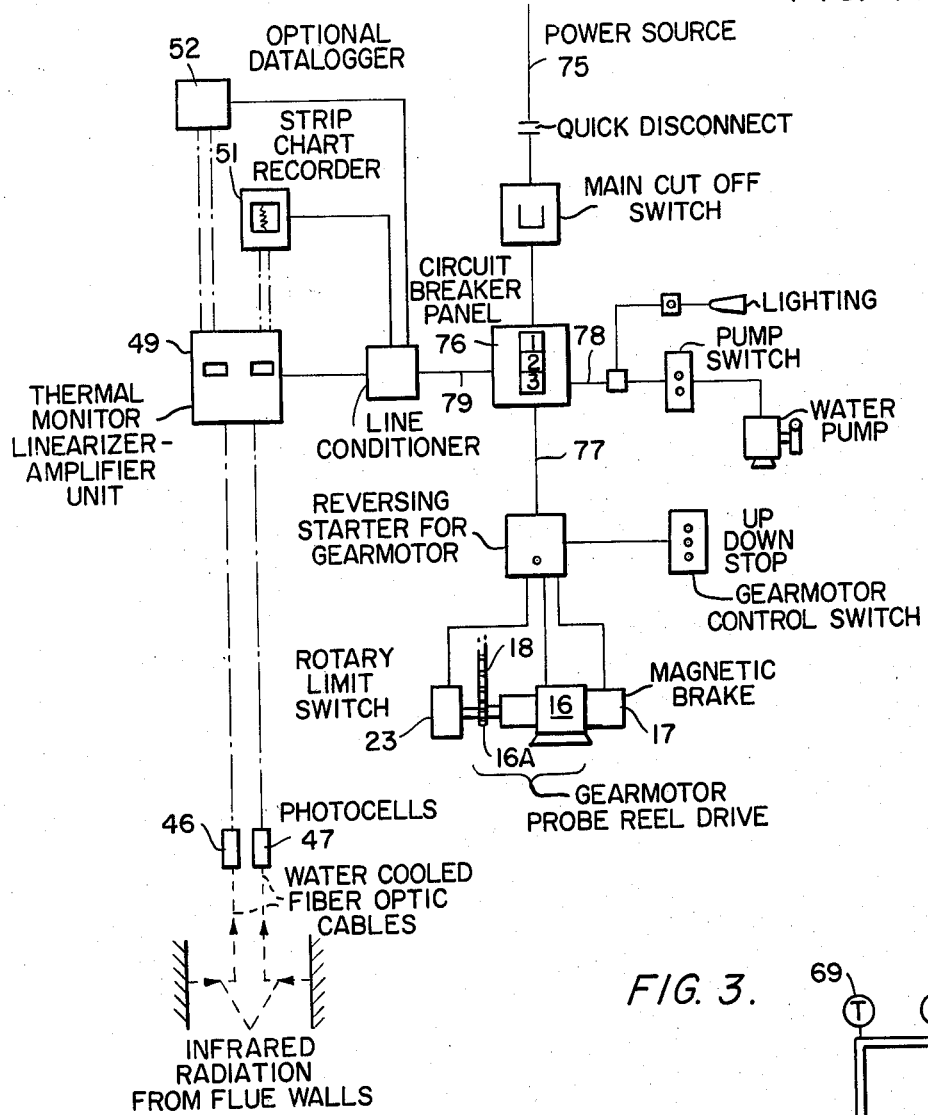
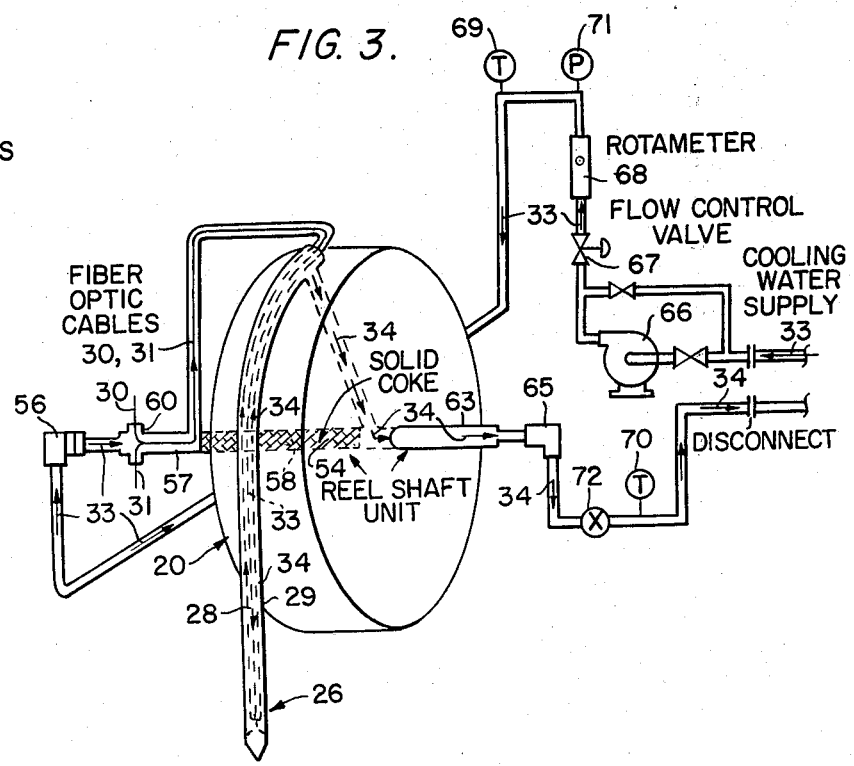
FIG. 4.
FIG. 3.

COKE OVEN FLUE TEMPERATURE MEASURING PROCESS AND PROBE MACHINE

BACKGROUND OF THE INVENTION

The present invention relates to a method and apparatus to measure the high temperatures such as are encountered with coke oven flue walls and more particularly to a method and apparatus for measuring the radiant energy emitted by a flue wall through use of a probe inserted into the flue.

Coke oven flue temperatures are not only needed for the development of an effective heating control system, but also for the daily operation of the ovens.

Prior methods of obtaining this temperature information have not been efficient enough to gather this data at a frequency necessary to fulfill these needs.

Some of the prior art methods and apparatus of gathering coke oven flue temperatures involve the sighting of a hand-held optical pyrometer through the flue port of the top of the flues. This measures only the bottom temperatures. Other methods which have been used to probe the battery in order to obtain full vertical temperature profiles have involved cumbersome apparatus which has interfered with coking operations and has required laborious efforts in order to set up. Moreover this apparatus used sensing devices which could not be or were not adequately cooled, and were often too complicated or fragile to be practical as an everyday useful tool.

SUMMARY OF THE INVENTION

It is an object of the present invention to develop a compact and mobile machine to gather coke oven flue temperatures.

It is a further object of the present invention to have apparatus which can measure the temperatures along the vertical length of a coke oven flue on at least two opposite walls simultaneously at greatly improved rates over that accomplished by prior art devices. The measurement of four walls simultaneously is also possible with a change of design incorporating four fiber optic cables.

It is another object of the present invention to have a sensing probe which has effective water cooling so that probe and cable can better endure the high temperatures encountered in the flue.

Generally it is the object of the present invention to use a probe which can enter the flue space and requires simple handling on a mobile carriage for insertion and retraction of the probe head from the flue.

Basically the machine of the present invention includes optic cables to transmit infrared radiation to photoelectric detection-conversion cells, cooling for the optic cable, a probe head attached to the cable with means to view the radiation, a reeling machine for cable movement, and means to convert infrared radiation to temperatures.

The machine further includes a mobile conveyance upon which the apparatus is mounted.

The machine also includes as means to cool the cables, concentric flexible hoses to house and provide water cooling for the fiber optic cable.

BRIEF DESCRIPTION OF THE DRAWINGS

The above and other objects and advantages of the invention will become apparent upon full consideration of the following detailed description and accompanying drawings in which:

FIG. 1B is a front view of a portion of the apparatus of FIG. 1A;

FIG. 3 is a schematic showing of the piping for the cooling portion of this embodiment of the present invention;

FIG. 4 is a schematic showing the electrical and instrumentation connection of the apparatus of the present invention;

FIG. 5 is a detail drawing of the probe terminal head unit shown generally in FIG. 1A;

DESCRIPTION OF THE PREFERRED EMBODIMENT

Figure 1A:
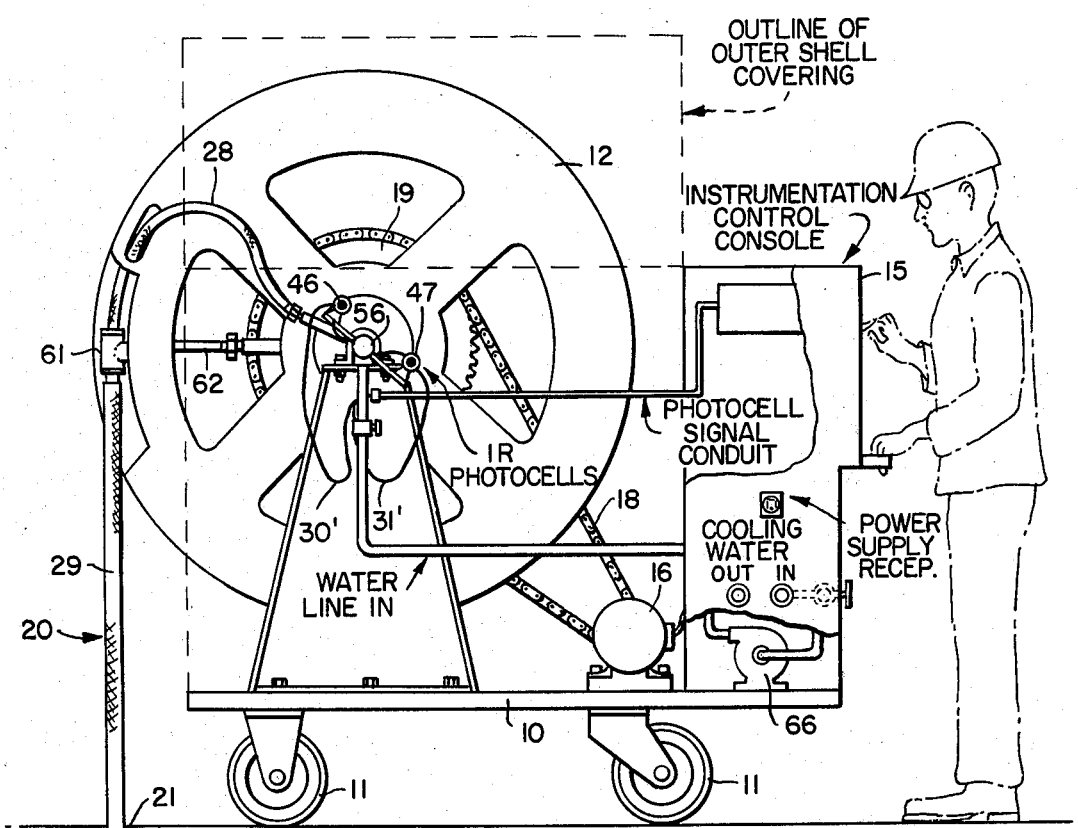
FIG. 1A is a side view of an embodiment of the overall apparatus of the present invention as it is in use.

FIGS. 1A and 1B show overall views of the temperature measuring probe machine of the present invention. The entire apparatus is extremely mobile in comparison with any other machine of this type disclosed in the prior art.

Figure 1C:
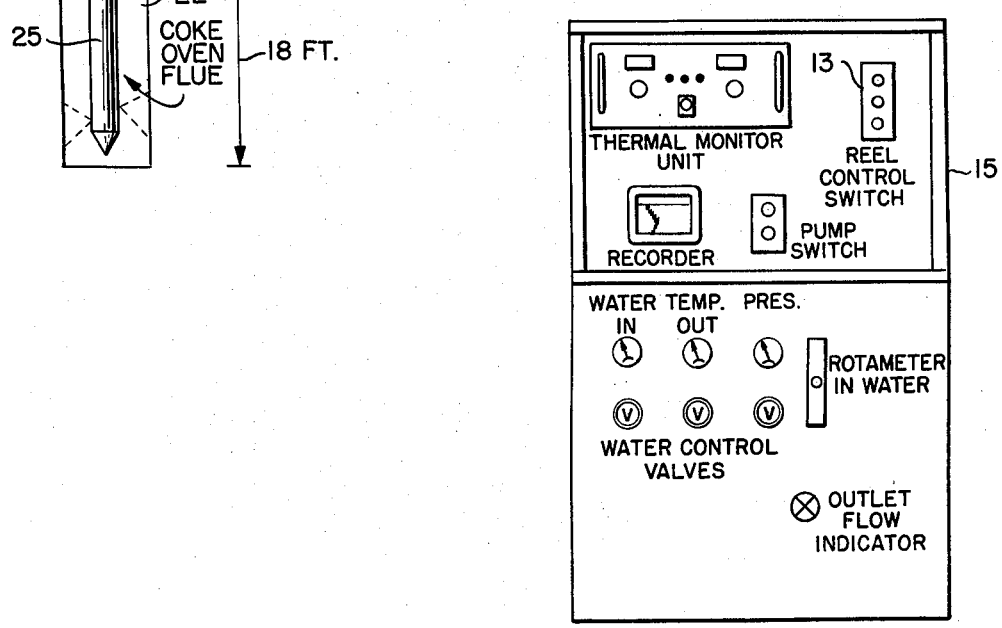
FIG. 1C is a back view of the portion of FIG. 1A showing the instrument control panel.
Figure 2:
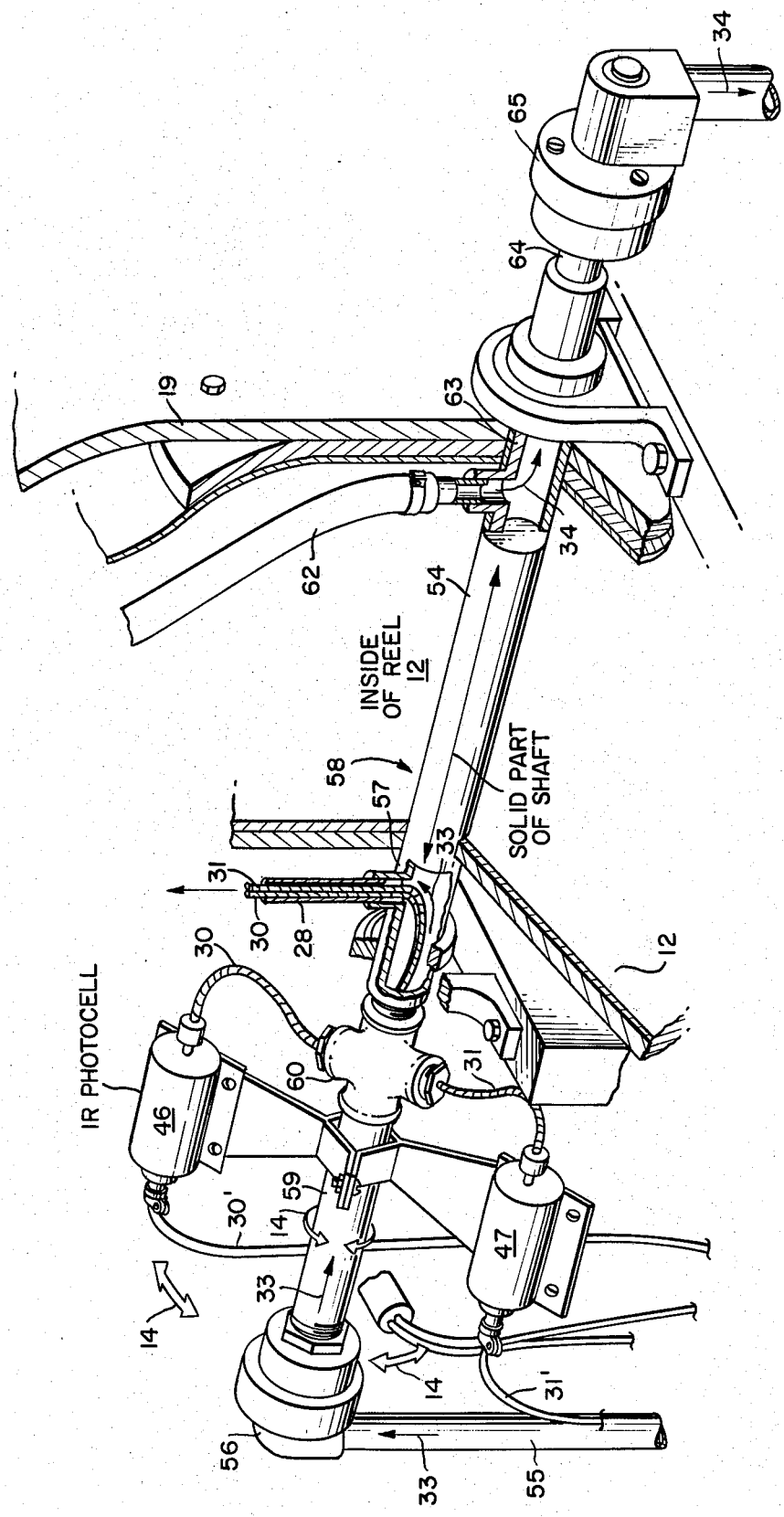
FIG. 2 is a detail showing of the shaft design of the reeling machine portion of FIG. 1A.

A cart or buggy 10 having wheels or casters 11 upon which the whole apparatus is mounted carries a reel 12 which through a reel control switch 13 on the instrument control panel 15, shown in the back view in FIG. 1C, is rotated by gearmotor 16 as indicated by arrows 14 seen in FIG. 2. Gearmotor 16 is equipped with magnetic brake 17 and gearmotor 16 connects by drive sprocket 16A on gearmotor 16 with reel drive sprocket 19 attached on the side of reel 12 through roller chain drive 18.

Cart 10 is wheeled into position where a flexible metallic hose 20, preferably of stainless steel, is unwound from reel 12 into opening 21 leading into coke oven flue 22. Reel 12 is rotated at a constant speed by roller chain 18 and reel drive sprocket 19 which is powered by reversible gearmotor 16 driving drive sprocket 16A under control of reel control switch 13. The constant speed of insertion or withdrawal of probe head 25 located on the free end of flexible metallic hose 20 allows for calibration of the time interval for such insertion or withdrawal into distance measurement. Gearmotor 16 is equipped with magnetic brake 17 in order to assure drift-free stopping and with rotary limit switch 23 to prevent damage from overreeling.

An example of such a machine which has been constructed possesses a four foot diameter reel with a No. 60 sprocket having 96 teeth on a ¾ inch pitch that is chain driven by an 18 teeth drive sprocket powered by a 45 rpm, 1 HP reversible gearmotor. This arrangement will rotate the reel at 8.25 rpm and translates to an insertion or withdrawal time of about 15 seconds.

The diameter of reel 12 is somewhat arbitrary but can be reduced to no less than about two feet, which is somewhat about the lower limit of the bending radius of flexible metallic hose 20, this bending radius setting the minimum reel diameter. Of course, any size change must be accompanied by appropriate changes in the drive. One example of distances to be travelled by a probe in a coke oven flue is illustrated in FIG. 1A.

Hose 20 connected to probe head 25 as seen in FIGS. 3 and 5 is composed of two concentric flexible metallic hoses 28, 29. An inner hose 28, extended into probe terminal head 25 carries fiber optic cables 30, 31 and serves as a conduit for cooling water with water flow in the direction of probe terminal head 25 designated in inner hose 28 and elsewhere in the system by arrows 33, and in the direction away from head 25 in outer hose 29 and elsewhere by arrows 34. The unit which is probe 26 includes hose 20, its contents, and probe terminal head 25. Probe 26 is the unit which is subjected to the intense heat of coke oven flue 22.

Outer hose 29, attached to both terminal head 25 and reel 12, allows the exit flow of the cooling water as shown by arrows 34 in FIGS. 3 and 5 with more detail in the reel 12 vicinity of in and our flow shown in FIG. 2. Outer hose 29 also provides the load bearing strength for probe 26.

Hoses for use in this machine are commercially available and such hoses which could be used in an embodiment of the invention would be an outer hose 29 comprising 1½ inch stainless steel hose of a seamless bellows type covered with single ply stainless steel braiding for strength and minimal stretching, and an inner hose 28 comprising a ½ or ¾ inch hose of the same type.

Fiber optic cables 30, 31 in the system of an embodiment of the present invention use two separate fiber optic cables 30, 31 that terminate in probe terminal head 25 at the outside of wall 41 with high temperature quartz or sapphire tips 42, 43 protruding through wall 41 and positioned normal to the vertical walls of flue 22 and separated from each other by 180 degrees as shown in FIG. 5. Therefore, two opposite walls of flue 22 can be scanned simultaneously.

The scanning tips 42, 43, as are fiber optic cables 30, 31, are ⅛ inch in diameter in one embodiment. The scanning is unfocused and has a viewing cone 44, shown at tip 42, of about 60 degrees. The view area of the wall of flue 22 depends upon the distance of tip 42 or 43 from the wall. The recorded temperature is the average temperature within the confines of the viewed area on the wall. As shown diagrammatically in FIG. 4, all the radiation viewed by tips 42, 43 is transmitted to infrared photocells 46, 47 which are equipped with filters to eliminate interference from infrared radiation emanating from the hot combusion gases mainly composed of carbon dioxide and water vapor. The infrared light is converted to electrical signals which are processed in thermal monitor unit 49 to produce a linearized analog signal to strip chart recorder 51 or to analog to digital converterdatalogger 52. The ultimate readout is temperature versus flue height. The temperature recorded represents the average within view of viewing cone 44 at any given height in flue 22.

Figure 5A:
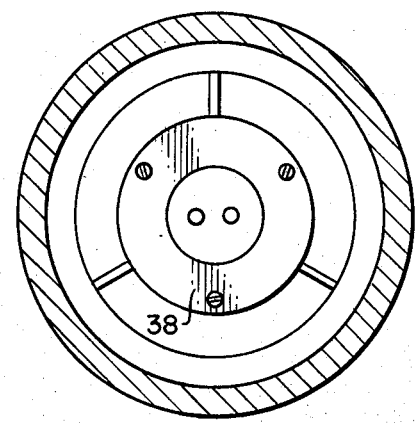
FIG. 5A is a view along line V—V of FIG. 5.

Details of construction of terminal head 25 of probe 26 are further shown in FIGS. 5 and 5A. Head 25 is constructed from stainless steel pipe forming wall 41 of head 25 and is so designed for easy installation of terminal tips 42, 43 of the fiber optic cables 30, 31 respectively without damage by twisting. Head 25 is constructed having sufficient weight to act as a plub bob for flexible hose 20. Tapered ends on cap 36 assures easy slippage past brick obstruction. Terminal tips 42, 43 may be fixed in place with o-seal straight compression fittings as shown. The inner hose 28 is held in place in head 25 by the holddown ring assembly 38 with bottom view of assembly 38 shown in FIG. 5A.

Cooling water to maintain cooling of probe 26 is introduced through fixed pipe 55 connected to 90 degree elbow rotary union 56 connected in turn to hollow part 57 of shaft 58 of reel 12. FIG. 2 shows the details of this shaft arrangement. Water flows as shown by arrows 33 through rotary union 56, connecting pipe 59, through cross pipe fitting 60, and into the hollow part 57 of reel shaft 58. Cross pipe fitting 60 allows fiber optic cables 30, 31 to enter the cooling water conduit along which they extend into probe 26. Both the water flowing in the direction of arrows 33 and fiber optic cables 30, 31 leave hollow part 57 of shaft 58 through inner metallic hose 28 of probe 26 along the outside of reel 12 as illustrated in FIGS. 1A, 1B and 2. The water exiting from probe 26, having been heated during its cooling of the probe, passes through support tee pipe 61 mounted on reel 12 and then is directed toward the inside of reel 12 by hose 62, which may be of the ordinary steam or water type, and enters hollow part 63 of shaft 58 on the opposide side of solid part 54 of shaft 58 from hollow part 57. The water, following the flow shown by arrows 34 flows through connecting pipe 64 and rotary elbow union 65.

FIG. 3 shows the complete piping schematic for the cooling system. The cooling water, in the embodiment shown, is externally supplied through an easily detachable water hose and enters pump 66, sized to produce about a 30 foot head. A control valve 67 and rotameter 68 are used to set flow rates. Temperatures are measured by gages 69 on the water inlet side and 70 on the water outlet side to assure proper cooling. An inlet pressure gage 71 and an outlet flow indicator 72 are used to assure flow through the entire system without leaks.

FIG. 4 shows an electrical and instrumentation schematic of the machine of the present embodiment with line 75 connected to an external power supply, which in this case may be 230 volt, AC, 3 phase. At circuit breaker panel 76 the feed power is split into three circuits 77, 78, and 79. Circuit 77 is a 230 volt, 3 phase circuit to power reversible gearmotor 16. Circuit 78 is a 115 volt single phase circuit to power water pump 66. Circuit 79 is another 115 volt single phase circuit for the instrumentation package. This last circuit 79 is supplied with a line conditioner to assure stable voltages for the instrumentation in order to maintain accuracy in measurements.

Figure 6:
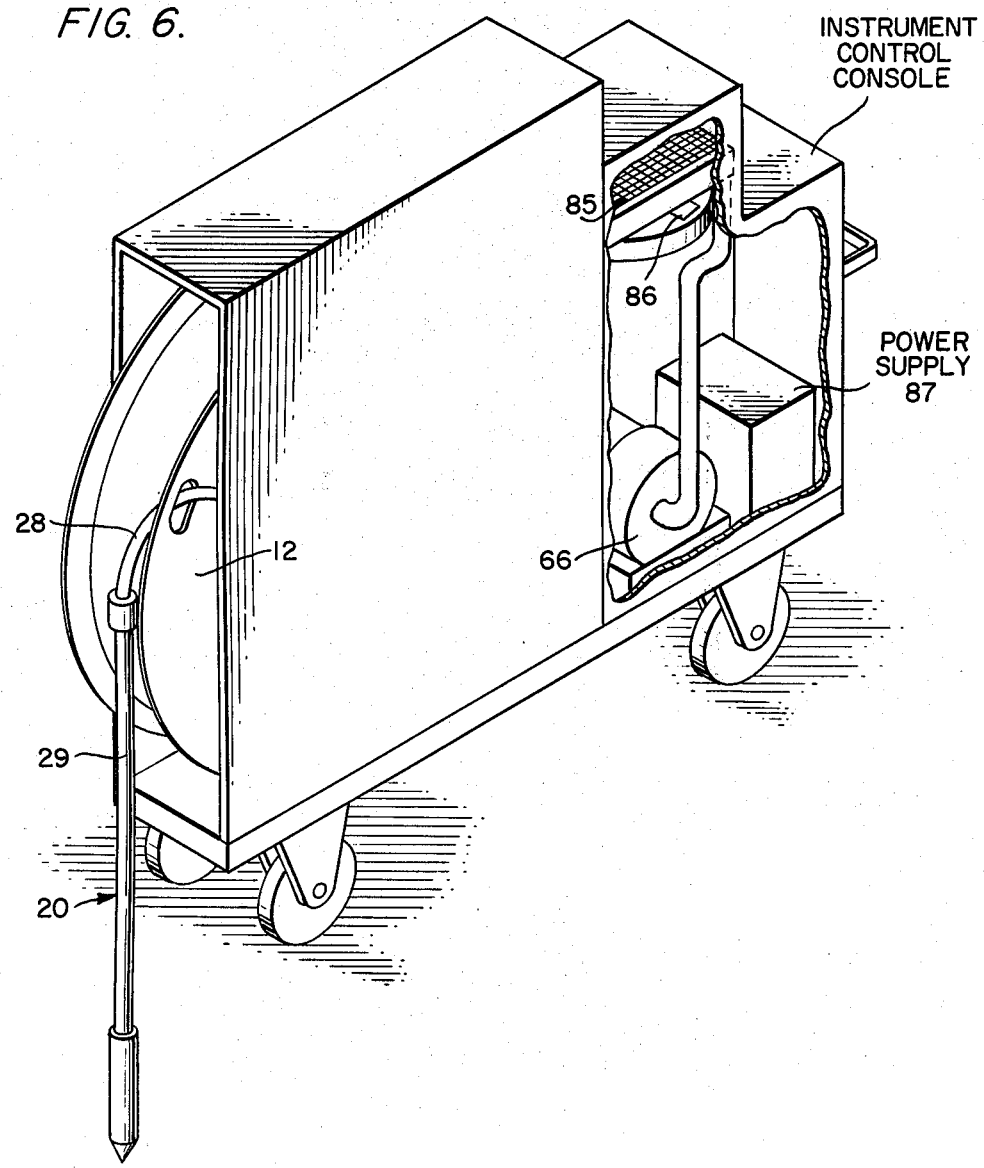
FIG. 6 is a perspective overall view of another embodiment of the present invention.

Another embodiment illustrated in FIG. 6 uses an onboard closed loop cooling system similar to an automotive system incorporating a radiator 85 and a fan 86. This along with an onboard power supply 87 of batteries or a motor-generator make the machine free of the unbilical type cords of the first embodiment illustrated.

Therefore it will be obvious to those skilled in the art that various changes may be made without departing from the scope of the invention and the invention is not to be considered limited to what is shown in the drawings and described in the specification.

We claim:

1. A temperature measuring probe machine for measurement of high temperatures found in an enclosure as in a coke oven flue comprising
    a sensing probe means to enter the enclosure to measure the temperatures within the enclosure at selected heights in the enclosure, said sensing probe means including a probe terminal head, inner and outer flexible hoses attached to said probe terminal head, and fiber optic cables connected to said probe terminal head through said inner flexible hose, reel means attached to, and around which is wound, said sensing probe means to insert and withdraw said sensing probe means from the enclosure, cooling means to protect said sensing probe means from the high temperatures in the enclosure forming an internal portion of said sensing probe means, carriage means to carry said reel means, instrumentation and control means mounted on said carriage means in operative connection with said sensing probe means and said reel means, and means to supply power to said reel means, said cooling means, and said instrumentation and control means.

2. The temperature measuring probe machine of claim 1, further characterized by said means to supply power and said cooling means being self contained on said carriage means.

3. The temperature measuring probe machine of claim 1, further characterized by said reel means including
means to rotate said reel means including
a gearmotor,
a drive gear sprocket on said gearmotor and a reel drive sprocket on said reel means,
connecting means between said drive gear sprocket and said reel drive sprocket.

4. The temperature measuring probe machine of claim 1, further characterized by said instrumentation and control means including
conversion means connected to said fiber optic cables to change detected infrared radiation to electrical signals,
recording means connected to said conversion means.

5. The temperature measuring probe machine of claim 1, further characterized by said cooling means including
cooling liquid passing to said probe terminal through said inner flexible hose and from said probe terminal head through said outer flexible hose, and
pump means to move said cooling liquid to and from said probe terminal head.

6. The temperature measuring probe machine of claim 5, further characterized by scanning tips attached at the ends of said fiber optic cables and mounted to scan through the wall of said probe terminal head in opposite directions from each other.

7. The temperature measuring probe machine of claim 5, further characterized by said reel means including
a shaft along its center axis having hollow portions forming part of said cooling means comprising pathways for said cooling liquid,
first conduit means between one of said hollow portions and said inner flexible hose,
second conduit means between said outer flexible hose and the other of said hollow portions.

8. The temperature measuring probe machine of claim 7 further characterized by said first conduit means being a portion of said inner flexible hose extending beyond said outer flexible hose away from said probe terminal head.

9. The temperature measuring probe machine of claims 1, 5, 6, 7, 8, 3, or 4, further characterized by said means to supply power being carried entirely on said carriage means.

10. The temperature measuring probe machine of claims 1, 5, 6, 7, 8, 3, or 4, further characterized by said cooling means including
a water pump,
a radiator connected to said water pump, and
fan means adjacent said radiator to cool said radiator.

11. A method of measuring high temperatures in a coke oven flue enclosure comprising the steps of wheeling a temperature measuring unit to a position closely adjacent to the opening of the enclosure,
instituting a flow of liquid through inner and outer concentric hoses and a probe head attached thereto,
lowering the probe head attached to said inner and outer concentric hoses into an opening at the top of the enclosure by unreeling said hoses from a reel,
detecting infrared radiation from the walls through fiber optic cable, and
translating detected radiation into temperatures.

12. The method of claim 11 further characterized by lowering the probe head and hoses at a constant predetermined speed,
timing the constant speed lowering and raising of the probe head, and
translating the time and speed into distance travelled by the probe head in the enclosure.

* * * * *